Aug. 18, 1931. J. W. HUGHES 1,819,602
FILTERING APPARATUS
Filed Aug. 2, 1926
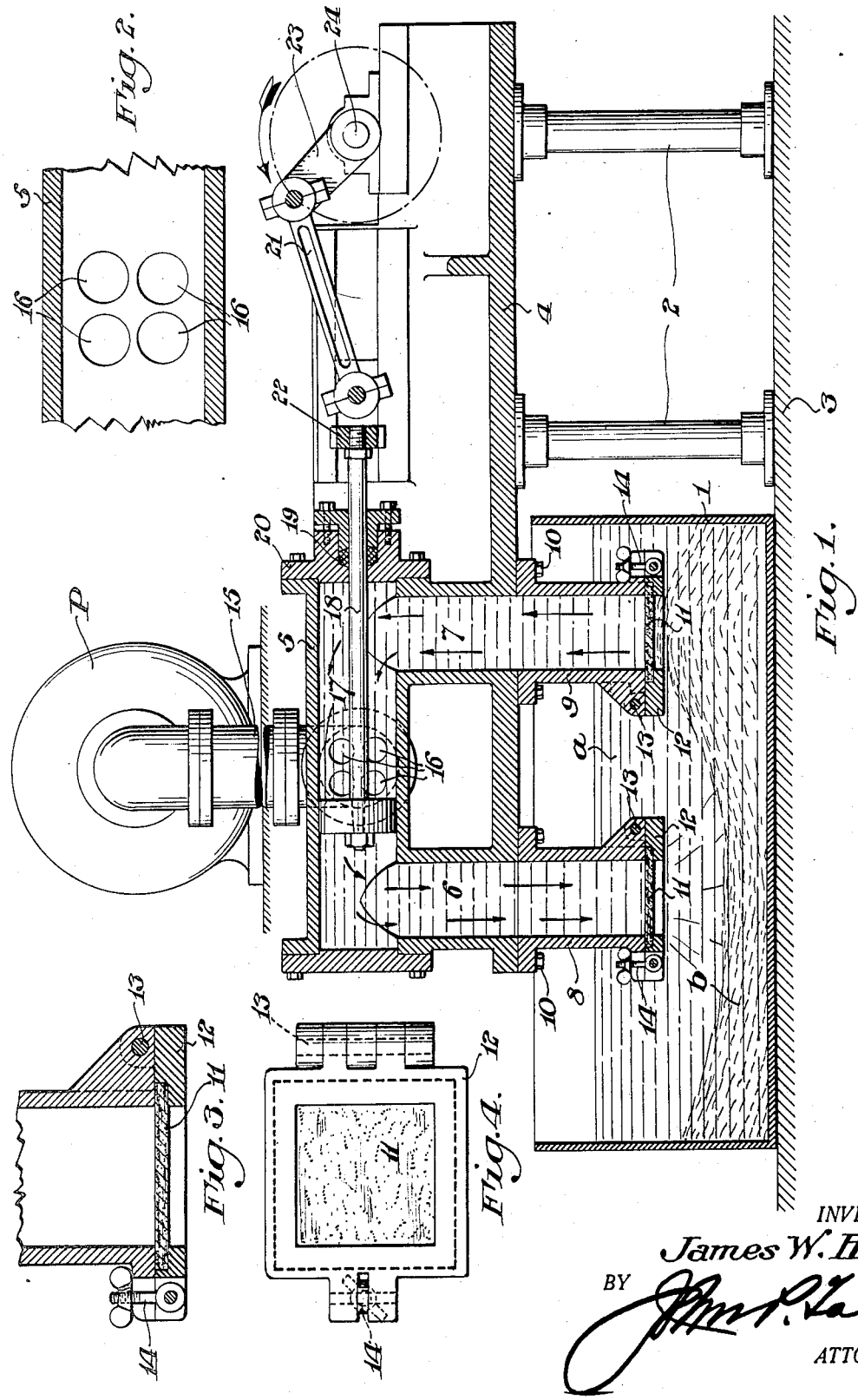
INVENTOR.
James W. Hughes,
BY
ATTORNEY.

Patented Aug. 18, 1931

1,819,602

UNITED STATES PATENT OFFICE

JAMES W. HUGHES, OF PHILADELPHIA, PENNSYLVANIA, ASSIGNOR TO BUDD WHEEL COMPANY, OF PHILADELPHIA, PENNSYLVANIA, A CORPORATION OF PENNSYLVANIA

FILTERING APPARATUS

Application filed August 2, 1926. Serial No. 126,504.

This invention relates to filtering devices for liquids, and more particularly to the filtering of a liquid at the mouth of a pipe or conduit.

If a filter screen be placed across the mouth of a conduit, and submerged in the liquid to be filtered, and a pump or the like be applied to the conduit, so as to cause the liquid to be drawn into the conduit through the filter, it is found that the filter soon becomes clogged and the flow of liquid greatly reduced or stopped.

It is the object of the present invention to provide simple and effective means for keeping such a filter screen clean and unobstructed, so that the liquid may flow freely therethrough during long periods of operation. To this end, I propose to provide means for periodically setting up a momentary reverse flow of liquid through the filter screen, whereby the foreign matter accumulating on the outside of the filter is constantly removed therefrom.

In order that the invention may be readily understood, reference is had to the accompanying drawings, forming part of this specification, and in which:—

Figure 1 is a vertical sectional view of a filtering apparatus embodying my invention;

Figure 2 is a similar sectional view, on an enlarged scale, of a portion of the cylinder in the region of the outlet ports, and Figures 3 and 4 are fragmentary sectional and inverted plan views, respectively, showing, on an enlarged scale, the construction of the filter screen holder.

Referring to the drawings in detail, 1 designates a tank or receptacle containing the liquid $a$ to be filtered. My improved apparatus is supported on pedestals, as indicated at 2, which rest on a suitable base 3 upon which the tank is also supported. These pedestals 2 carry at their upper ends a frame 4, a portion of which projects over the tank 1. This portion of the frame comprises a cylinder 5 from the opposite ends of which conduits 6 and 7 extend downwardly. For convenience of manufacture, these conduits are each formed in two sections, an upper section integral with the cylinder 5 and terminating at the bottom of the frame 4 and lower detachable sections 8 and 9 secured to the base of the frame as by screws 10. The lower ends of these sections 8 and 9 of the conduits 7 and 6 are submerged in the liquid to be filtered and carry suitable filter screens 11 extending across the open ends thereof. The filter screens are held in place against the ends of the conduits by means of a frame 12, which, to permit ready removal of the filter screens, may be pivoted at one side, as at 13, and provided at the other side with a suitable fastening device, such as a swinging eye-bolt 14 or the like. Tapping the side of the cylinder 5, preferably adjacent its middle portion is a conduit 15, extending to a suitable pump such as the centrifugal pump indicated by P, which serves to create a suction to draw liquid from the tank. The conduit 15 communicates with the cylinder 5 through a plurality of relatively small holes or ports 16, as clearly shown in Fig. 2.

Arranged to reciprocate within the cylinder 5 is a piston 17, secured to a piston rod 18, which extends through a stuffing box 19 carried by the right-hand head 20 of the cylinder. This piston may be reciprocated by any suitable mechanism, as for example, a pitman rod 21 having one end connected to the piston rod by a cross head 22 suitably guided in the frame 4, and its opposite end, to a crank or the like 23 mounted on a shaft, as 24, which is driven by any suitable means (not shown).

In Fig. 1 the piston is shown as having first passed the middle of its stroke, from which it will be apparent that it passes, at each stroke, the outlet ports 16 leading to the pump conduit 15, the limits of each stroke being adjacent the intake or branch conduits 6 and 7. It will be noted, however, that the outlet ports 16 are so spaced with relation to the width of the piston, that the flow of liquid through these ports is at no time shut off, even when the piston is passing the ports. By the provision of a plurality of small ports instead of a single large port, the piston is more effectively guided past the outlet leading to the pump conduit 15.

From the foregoing, it will be obvious that the suction created by the centrifugal or other pump will serve to draw the liquid up through the screens 11 and branch conduits 6 and 7, into the main or pump conduit 15. Whenever the piston passes to one side of the ports 16 it cuts off the flow of liquid to the main conduit 15 from the branch conduit at that end of the cylinder and liquid can enter the main conduit only through the other branch conduit. For example, as soon as the piston passes the ports 16, let us say, while it is moving toward the left, as in Fig. 1, it not only shuts off the flow of liquid through the filter screen 11 at the mouth of conduit 6, but the filtered liquid which at the moment fills the end of the cylinder and the branch conduit 6, is forced outwardly or in reverse direction through the branch conduit and the corresponding screen 11, thus dislodging from the outside of such screen any of the foreign solid matter $b$ which may have accumulated thereon during the preceding part of the cycle. As the piston reciprocates, this reverse flow is set up first through one screen, and then through the other, thus maintaining these screens substantially clean and unobstructed. Although the flow through each screen is periodically reversed, it will be noted that the flow through the main conduit 15 leading to the pump P is of course always in the same direction, the pump being always in communication with one or the other of the branch conduits 6 and 7, liquid passing through one screen from the tank toward the cylinder and pump, while it is being forced by the piston in reverse direction through the other screen.

While my invention is applicable to many different kinds of mixtures of solid and liquid material which it is desired to filter, it is particularly useful in connection with the filtering of oils or emulsions such as are used to lubricate and cool the cutting tool in metal working machines, the object of the filtering operation being to remove from the liquid the fine metal particles or chips carried in suspension by the liquid, and thus enable the liquid to be used over and over again.

What I claim is:—

1. The combination with a cylinder, of a main conduit connected with the side thereof, a pair of branch conduits connected with the ends of said cylinder and submerged in a liquid to be filtered, a filter screen in each branch conduit, means for creating a suction in the main conduit, a piston fitting said cylinder, and means for causing said piston to pass back and forth across the point of connection of said main conduit with the cylinder.

2. The combination with a conduit having two branches, a filter in each branch, and means for causing liquid to flow continuously into said conduit and means to close the said branches and coincidently cause a reverse current in the closed branch.

3. The combination with a conduit having two branches, a filter in each branch, a means for causing liquid to flow continuously into said conduit and means to alternately close the said branches and coincidently form a reverse current in the closed branch of shorter duration than the direct current.

4. The combination with a conduit having two independent branches, of a filter screen in each branch, said branches being submerged in a liquid to be filtered, means for causing a suction in the conduit so as to draw the liquid into the same through said screens, and unitary means for alternately throwing the branches of said conduit into and out of communication with said suction means.

5. The combination with a conduit having two independent branches, of a filter screen in each branch, said branches being submerged in a liquid to be filtered, means for causing a suction in the conduit so as to draw the liquid into the same through said screens, and unitary means for alternately throwing the branches of said conduit into and out of communication with said suction means, said unitary means effecting a pressure in the conduit which is thrown out of communication with said suction means whereby to effect a reverse flow of fluid therein.

In testimony whereof he hereunto affixes his signature.

JAMES W. HUGHES.